May 22, 1951  H. C. KUHN  2,554,413
APPARATUS FOR CATALYTIC CRACKING OF HYDROCARBONS
Filed July 10, 1945  12 Sheets-Sheet 1

INVENTOR
Herman C. Kuhn
BY
ATTORNEYS

May 22, 1951  H. C. KUHN  2,554,413
APPARATUS FOR CATALYTIC CRACKING OF HYDROCARBONS
Filed July 10, 1945  12 Sheets-Sheet 2

INVENTOR
Herman C. Kuhn
BY
Pennie, Davis, Marvin & Edmonds
ATTORNEYS

May 22, 1951   H. C. KUHN   2,554,413
APPARATUS FOR CATALYTIC CRACKING OF HYDROCARBONS
Filed July 10, 1945   12 Sheets-Sheet 3

INVENTOR
Herman C. Kuhn
BY
ATTORNEYS

Fig. 12.

May 22, 1951  H. C. KUHN  2,554,413
APPARATUS FOR CATALYTIC CRACKING OF HYDROCARBONS
Filed July 10, 1945  12 Sheets-Sheet 6

Fig.13

INVENTOR
Herman C. Kuhn
BY
ATTORNEYS

May 22, 1951  H. C. KUHN  2,554,413
APPARATUS FOR CATALYTIC CRACKING OF HYDROCARBONS
Filed July 10, 1945  12 Sheets-Sheet 7

INVENTOR
Herman C. Kuhn
BY
Pennie, Davis, Marvin & Edmonds
ATTORNEYS

May 22, 1951 H. C. KUHN 2,554,413
APPARATUS FOR CATALYTIC CRACKING OF HYDROCARBONS
Filed July 10, 1945 12 Sheets-Sheet 8

INVENTOR
Herman C. Kuhn
BY
Pennie, Davis, Marvin & Edmonds
ATTORNEYS

May 22, 1951 H. C. KUHN 2,554,413
APPARATUS FOR CATALYTIC CRACKING OF HYDROCARBONS
Filed July 10, 1945 12 Sheets-Sheet 9

Fig.18.

INVENTOR
Herman C. Kuhn
BY
ATTORNEYS

May 22, 1951 H. C. KUHN 2,554,413
APPARATUS FOR CATALYTIC CRACKING OF HYDROCARBONS
Filed July 10, 1945 12 Sheets-Sheet 10

INVENTOR
Herman C. Kuhn
BY
ATTORNEYS

May 22, 1951  H. C. KUHN  2,554,413
APPARATUS FOR CATALYTIC CRACKING OF HYDROCARBONS
Filed July 10, 1945  12 Sheets-Sheet 12

INVENTOR
Herman C. Kuhn
BY
ATTORNEYS

Patented May 22, 1951

2,554,413

UNITED STATES PATENT OFFICE 2,554,413

APPARATUS FOR CATALYTIC CRACKING OF HYDROCARBONS

Herman C. Kuhn, Hammond, Ind., assignor to Sinclair Refining Company, New York, N. Y., a corporation of Maine Application July 10, 1945, Serial No. 604,212

3 Claims. (Cl. 23—288)

My invention relates to improvements in catalytic cracking of hydrocarbons, more particularly to improvements in such operations in which a granular catalyst is moved through the region of reaction, in a reaction vessel, the cracking reactor or the regenerating kiln, between a level of introduction and a lower level of discharge. In such operations, uniform and regular downward flow of the granular catalyst between the two levels throughout the region of reaction is essential to efficiency and economy. For example, if part of the catalyst flows through the region of reaction more rapidly than other parts, catalyst exposure is not uniform and catalyst efficiency drops. Again for example, if the catalyst flow is irregular, the catalyst undergoes physical degradation with production of fines involving increased catalyst replacement. And, in operations in which the catalyst circulates between a cracking reactor and a regenerating kiln, the effects of non-uniformity or irregularity are not confined to the reaction vessel in which it occurs. For example, non-uniform flow in the cracking reactor may involve non-uniformity of coke deposit resulting from the cracking reaction in turn involving irregularities in the regenerating kiln in which such coke deposits are burned off of the catalyst. My invention promotes uniformity and regularity of catalyst flow through the region of reaction in such cracking operations.

A conventional, perhaps the general, approach to this problem is to provide a series of apertured collector baffles in the lower part of the reaction vessel, the lowest having the fewest apertures and each above having more than the next below, the apertures in each baffle being arranged with respect to those in the next lower baffle, or the discharge port in the lower end of the vessel, so that the several paths of flow through the apertures in the highest baffle are eventually gathered into a single path of flow through the discharge port. Theoretically, uniform and regular flow can thus be developed, but practically several factors interfere. Small changes have curiously large effects upon the flow of granular solids and some such small changes will persist in the practical realm. For example, small mechanical displacements will occur in such baffle structures in equipment through which catalyst may be moving at a rate of as much as 100 tons per hour or more. Again for example, local fluctuations in the density, surface condition, proportion of fines, and so forth of the catalyst will occur from time to time. My invention minimizes the effects of a number of such variables upon the flow and distribution of flow of the catalyst.

I have observed that a number of non-uniformities and irregularities of catalyst flow in such operations initially appear at a low point and move upwardly through the catalyst charge, against the direction of flow, growing as they move. To attempt to deal with such non-uniformities and irregularities by control imposed above the disturbance, however obvious this may seem, is futile. In granular flow by gravity, flow actually occurs as a succession of movements, the intervals of succession sometimes being very short, each movement being the motion of material filling a space emptied by material removed from below, the successive movements thus progressing upwardly. Thinking on this basis, it occurred to me that, if I could minimize variations in lateral distributions of flow between each aperture, or port, and the apertures above it, I might be able to reduce or eliminate the differences between the theoretical and practical results of application of apertured collector baffles to control flow of cracking catalysts through reaction vessels. Vertical baffles passing through the axis of the port or aperture struck me as the means to control lateral distribution of flow over the port or aperture, I tried such baffles and I found that, properly applied, they provided substantial improvement in control of catalyst flow. I have since come to call my baffles "splitter plates" because they split, and fix the distribution of, the flow entering the port or aperture to which they are applied. In practice, I find it advantageous, and usually sufficient for practical purposes, to provide my baffles or splitter plates for the discharge port or for the discharge port and the apertures through one or two of the lower collector baffles.

In the accompanying drawings I have first illustrated my invention and the principles of its application in a series of diagrams, Figs. 1–10, and I have then illustrated, diagrammatically and conventionally, two embodiments of my invention, in a regenerating kiln and in a cracking reactor, in Figs. 11–28.

Each of Figs. 1–6 illustrates the flow relationships between apertures in two or more superposed collector baffles in one of several situations.

Figure 1:
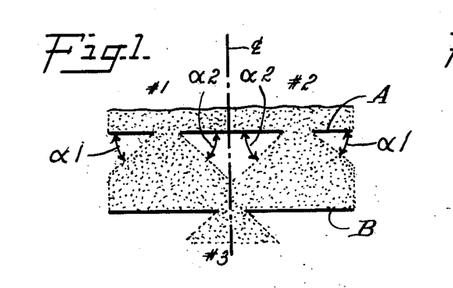
Figure 2:
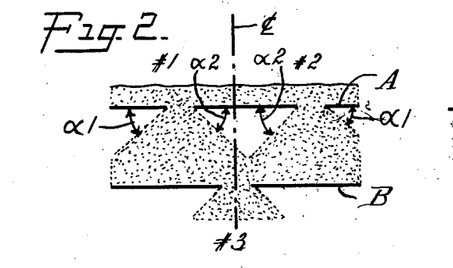
Figure 3:
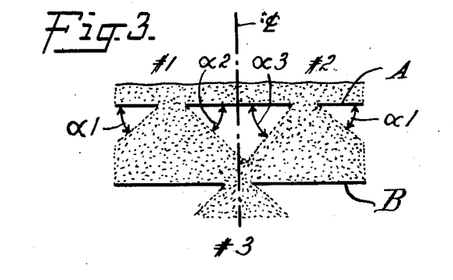

Referring first to Figs. 1 to 3: These three figures represent the situation prevailing when a single lower aperture #3 in a baffle B takes the flow of a granular catalyst from a pair of higher apertures #1 and #2 in a baffle A. In each instance the shape of the bodies of catalyst formed on the baffle B beneath the apertures #1 and #2 is defined by the static angle of repose $a1$ except where catalyst is flowing from such body in which regions it is defined by the dynamic angle of repose $a2$, $a2$ always being somewhat greater than $a1$. In the ideal situation represented in Fig. 1, the apertures #1 and #2 being precisely symmetrical with respect to the axis ℄ of aperture #3 and the catalyst being uniform in all respects affecting flow, catalyst flowing through aperture #3 is drawn equally from catalyst flowing through apertures #1 and #2. Now, if baffle A is displaced so that aperture #1 is closer to the axis of aperture #3 than is aperture #2, as represented in Fig. 2, catalyst flowing through aperture #3 is drawn in greater proportion from catalyst flowing through aperture #1 than from catalyst flowing through aperture #2. The bodies of catalyst on baffle B beneath apertures #1 and #2 are similarly defined, but, as indicated by the intersection of the upper surfaces of these bodies to the right of the axis ℄ in Fig. 2, catalyst removed from below through aperture #3 either comes in greater proportion from the body beneath aperture #1 or disestablishes equilibrium to greater extent in the body beneath aperture #1 thus increasing the relative flow through aperture #1. Flow through any aperture, of the granular catalyst, occurs only when the angle of the surface of the body of catalyst beneath that aperture exceeds the angle of repose. Thus, if the displacement of baffle A were so great that flow through aperture #3 were drawn wholly from the body of catalyst beneath aperture #1, flow through aperture #2 would cease. Again, assuming symmetry as in connection with Fig. 1, if a local variation in the proportion of fines occurs in that part of the catalyst flowing through aperture #2 such that the dynamic angle of repose for this part of the catalyst increases from $a2$ to $a3$, as represented in Fig. 3, catalyst flowing through aperture #3 is drawn in greater proportion from catalyst flowing through aperture #1 than from catalyst flowing through aperture #2. Normally, the bulk of the flow follows the surface of the several bodies of catalyst with but little movement of subsurface material but, if the proportion of fines increases, the subsurface voids are filled to a greater extent and the angle of repose increases. Similarly, other changes in the condition of the catalyst such as local variations in carbon elimination and consequent surface changes affect the angle of repose and thus the flow through particular apertures. The two effects just described in connection with Figs. 2 and 3 illustrate irregularities of a sort which are inevitable in practical operation and the sort with which my invention deals. While for the purpose of clarity I have detailed the situation as between three apertures in two plates, I want it understood that each such irregularity is reflected and re-reflected in flow through every aperture above the region of disturbance through which flow to that region normally occurs. Channelling of catalyst flow, surges of catalyst flow and development of static regions, for example, result. The disadvantages of such effects should be obvious although such difficulties have not always been properly identified nor attributed to the proper causes.

Figure 4:
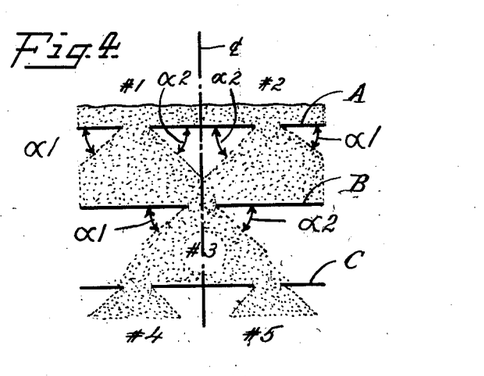

Referring to Fig. 4: This figure represents one of the less obvious causes of upward spread of irregularities such as those just discussed, and should be included among the irregularities with which my invention deals. If flow through aperture #4 ceases for any reason, flow through aperture #2 will increase relatively to flow through aperture #1 although the flows through apertures #1 and #2 may both decrease. Flow from beneath one side of aperture #3 favors flow through aperture #3 from higher apertures on the same side of aperture #3 as such flow.

Figure 5:
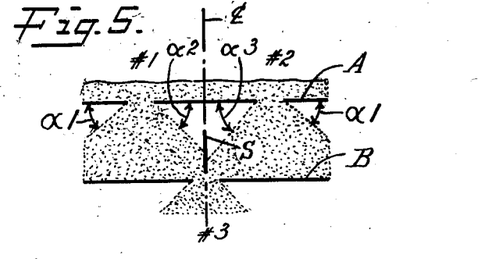
Figure 6:
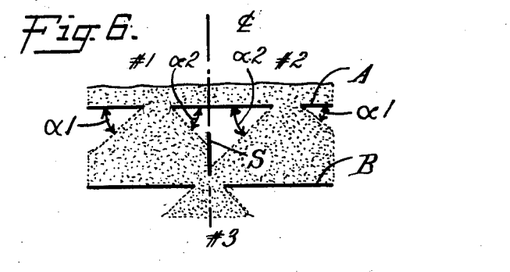

In Figs. 5 and 6 I have illustrated my invention as applied to suppression of such irregularities, particularly to the irregularities exemplified in Figs. 2 and 3 and using the same form of representation there employed: In accordance with my invention, I arrange a splitter plate S above the lower aperture #3 and passing through the axis C of the lower aperture #3 and separating the upper portions of the bodies of catalyst formed beneath the apertures #1 and #2 and wide enough to intersect the upper surface of these bodies at both the minimum and the maximum angle of repose encountered and all angles in between. Then, if the disturbance illustrated in Fig. 3 occurs for example, flow through aperture #3 will continue to be equally divided between apertures #1 and #2 notwithstanding the disturbance, as represented in Fig. 5. Or, if the disturbance illustrated in Fig. 2 occurs for example, flow through aperture #3 will continue to be equally divided between apertures #1 and #2 notwithstanding the disturbance, as represented in Fig. 6. In neither case will there be any upward spread of the initial disturbance.

Figure 7:
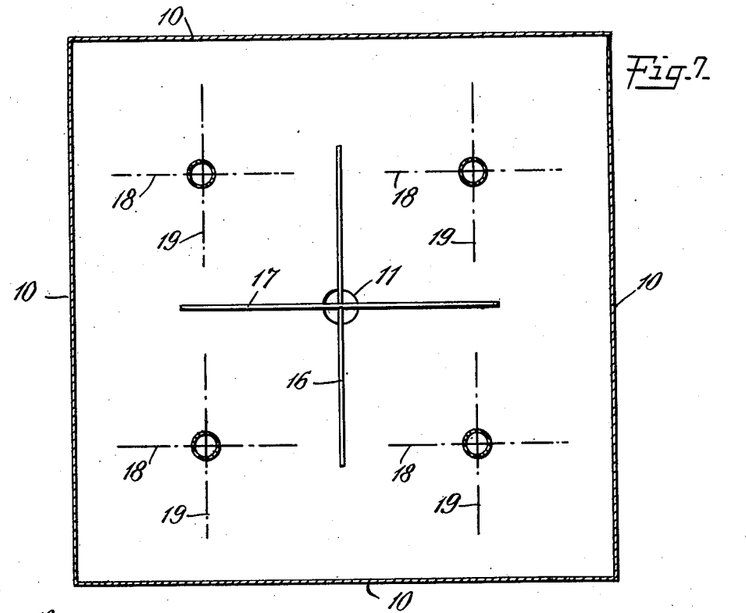
Fig. 7 is a section on line 7—7 of Fig. 8.
Figure 8:
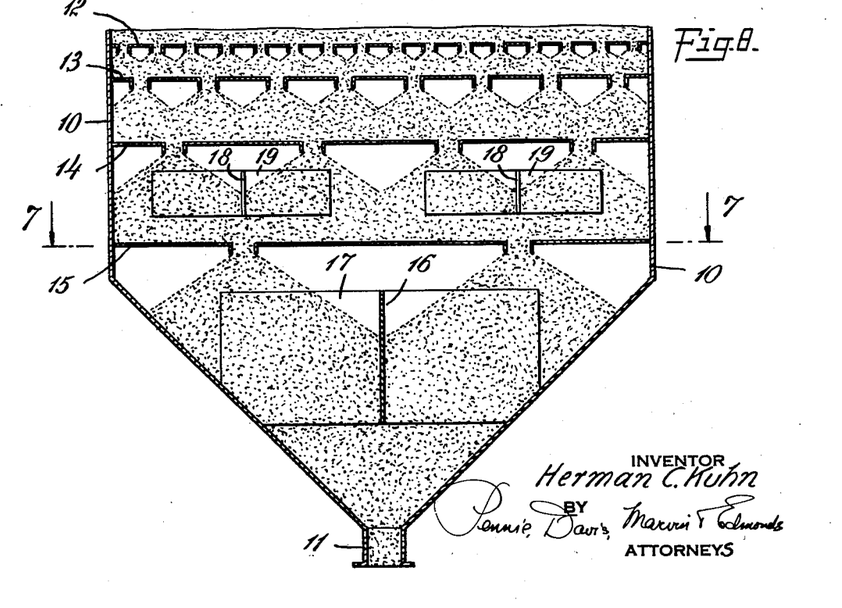
Fig. 8 represents a fragmentary vertical section of the lower end of a regenerating kiln.

I have illustrated application of my invention to a square vessel, a regenerating kiln for example, in Figs. 7 and 8: A charge of catalyst moves downwardly through this vessel, defined by walls 10, being supplied to the upper part of the vessel through appropriate connections and being discharged from the lower part of the vessel through connection 11. To establish and maintain uniformity and regularity of catalyst flow through the region of reaction in this vessel, a series of apertured collector baffles 12, 13, 14 and 15 are arranged in the lower part of the vessel. The lowermost baffle 15 has four apertures symmetrically positioned with respect to the discharge port, connection 11, the baffle 14 next above has sixteen apertures in groups of four symmetrically arranged with respect to one of the apertures in baffle 15, and so on. Within the vessel, below the horizontal baffle 15 and above the discharge port 11, I provide a pair of vertical baffles 16 and 17, each passing through the vertical axis of the discharge port 11 and thus intersecting along that axis, and each of width, measured along the vetrical axis of the discharge port 11, so great that at the minimum and the maximum and all intermediate angles of repose the surfaces of the bodies of catalyst forming beneath the apertures in baffle 15 intersect the vertical axis of the discharge port 11 within the boundaries of these vertical baffles 16 and 17. With respect to each other, such baffles are arranged so that the relative values of the dihedral angle between them are directly proportional to the relative horizontal areas of the vessel served by the apertures in the baffle immediately above them. In a square vessel, serving four apertures as in the baffle 15 each in turn serving an equal horizontal area of the kiln, these baffles are at right angles to each other. Another similar pair of vertical baffles 18 and 19 may be similarly arranged above each of the four apertures in the baffle 15 and below each group of four apertures in the baffle 14, for example. In this manner I secure excellent lateral distribution of flow across each of the horizontal collector baffles beneath which my splitter plates are provided, baffles 14 and 15 in Figures 7 and 8, with discharge of the catalyst flowing through the vessel through a single, centrally located discharge port in the lower end of the vessel.

Figure 9:
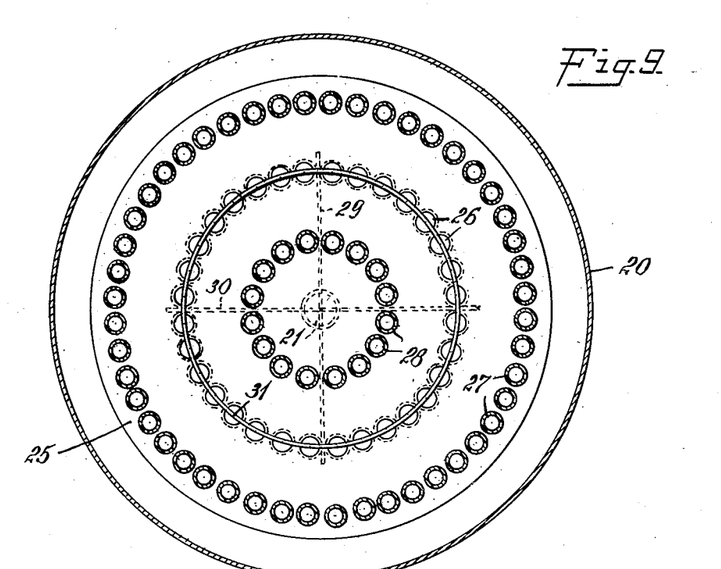
Fig. 9 is a section line 9—9 of Fig. 10.
Figure 10:
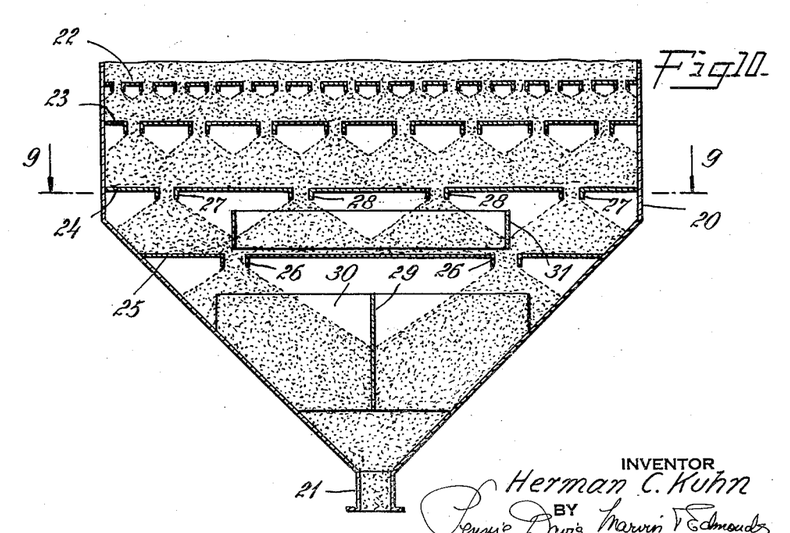
Fig. 10 represents a fragmentary vertical section of the lower end of a cracking reactor.

I have illustrated application of my invention to a round vessel, a cracking reactor for example, in Figures 9 and 10: A charge of catalyst moves downwardly through this vessel defined by wall 20, being supplied to the upper part of the vessel through appropriate connections and being discharged from the lower part of the vessel through connection 21. To establish and maintain uniformity and regularity of catalyst flow through the region of reaction in the vessel, a series of apertured collector baffles 22, 23, 24 and 25 are arranged in the lower part of the vessel. The lowermost horizontal baffle 25 is provided with a circle of apertures 26, the baffle next above 24 is provided with two circles of apertures 27 and 28, and so on, the center of each circle of apertures lying in the vertical axis of the discharge port, connection 21. I provide a pair of vertical baffles 29 and 30 intersecting along the vertical axis of the discharge port 21 and of width such that at both the minimum and the maximum and all intermediate angles of repose the upper, interior surface of the generally annular body of catalyst forming beneath the annulus of apertures 27 intersects the vertical axis of the discharge port 21 within the boundaries of these vertical baffles 29 and 30 within the vessel beneath the horizontal baffle 25 and above the discharge port 21. I provide another vertical baffle 31 passing through the vertical axis of each of the apertures 26 in horizontal baffle 25 beneath the horizontal baffle 24 and above the horizontal baffle 25, this annular vertical baffle 31 being of width such that at both the minimum and the maximum and all intermediate angles of repose the surfaces of the two generally annular bodies of catalyst forming beneath apertures 27 and 28 interesect the vertical axes of the several apertures 26 within the boundaries of this vertical baffle 31. In this manner I secure excellent lateral distribution of flow across each of the horizontal collector baffles beneath which my splitter plates are provided, baffles 24 and 25 in Figs. 9 and 10, with discharge of the catalyst flowing through the vessel through a single, centrally located discharge port in the lower end of the vessel.

Figure 11:
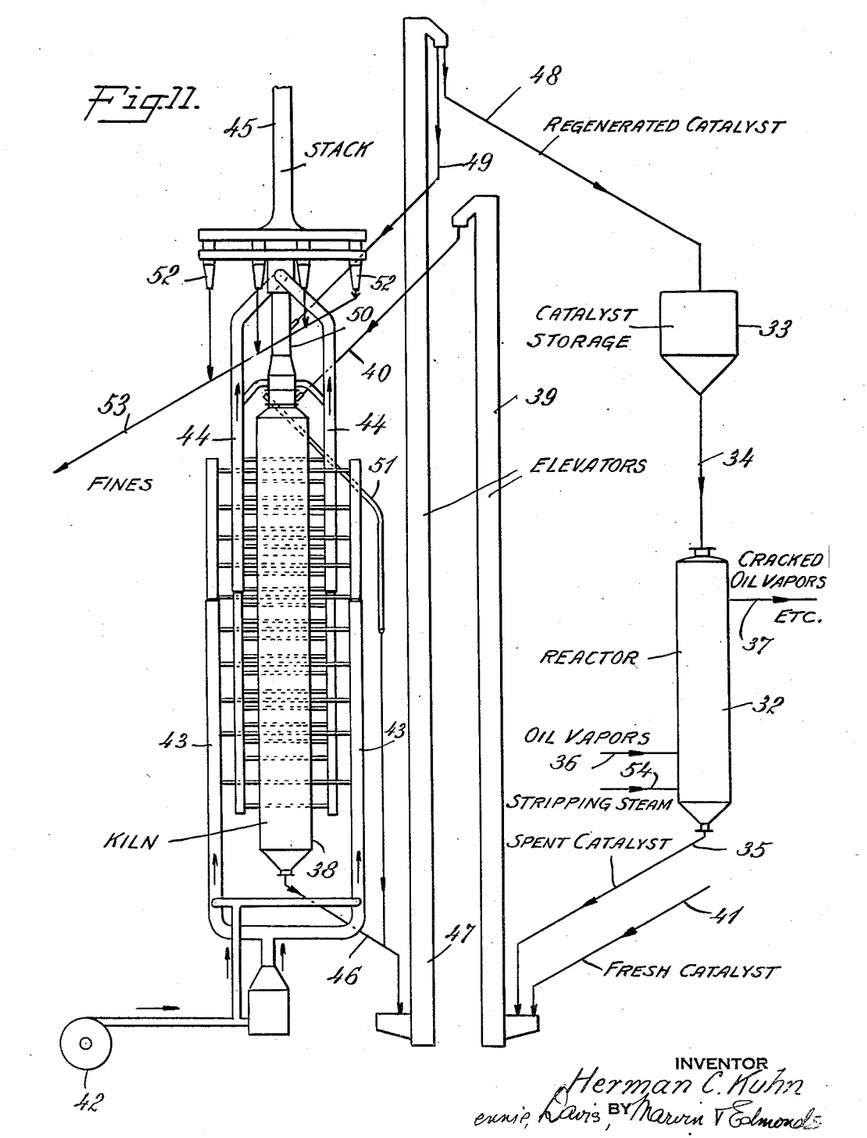
Fig. 11 is a flow diagram of a cracking system comprising a regenerating kiln and a cracking reactor each embodying my invention.
Figure 12:
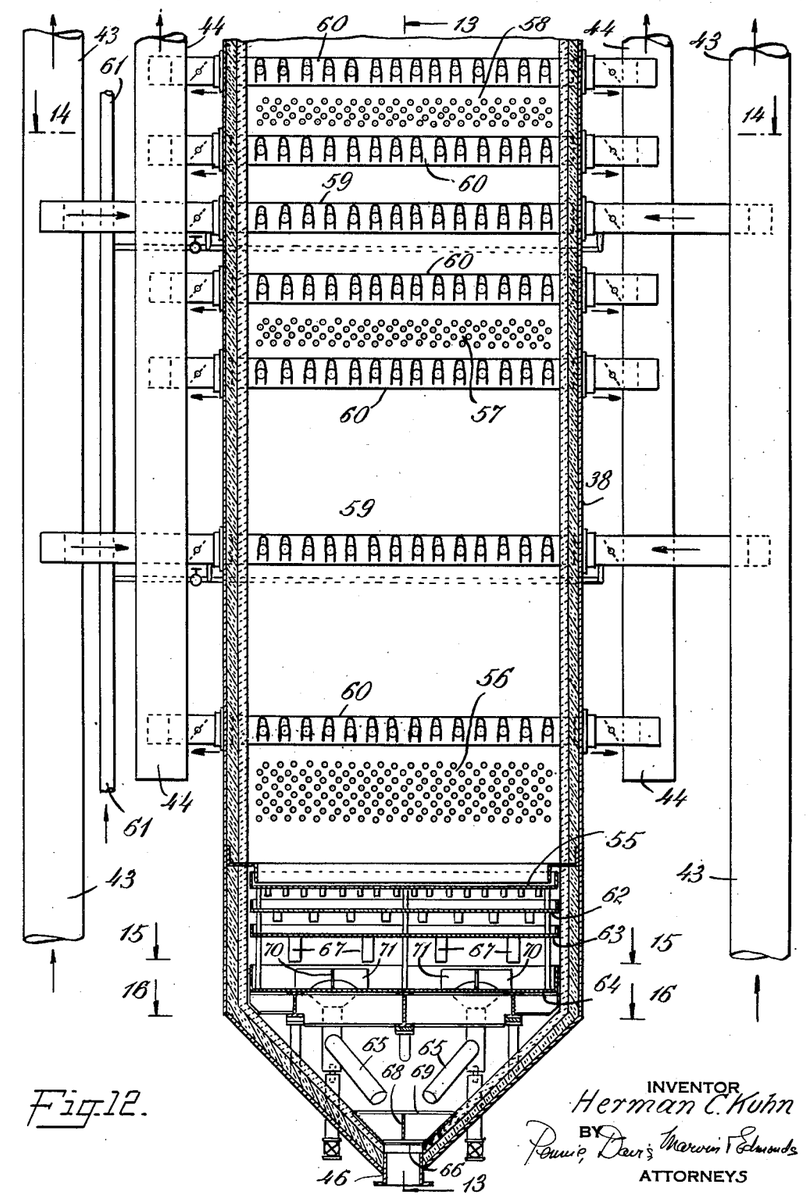
Fig. 12 is an enlarged vertical section of the lower part of the regenerating kiln illustrated in Fig. 11.
Figure 13:
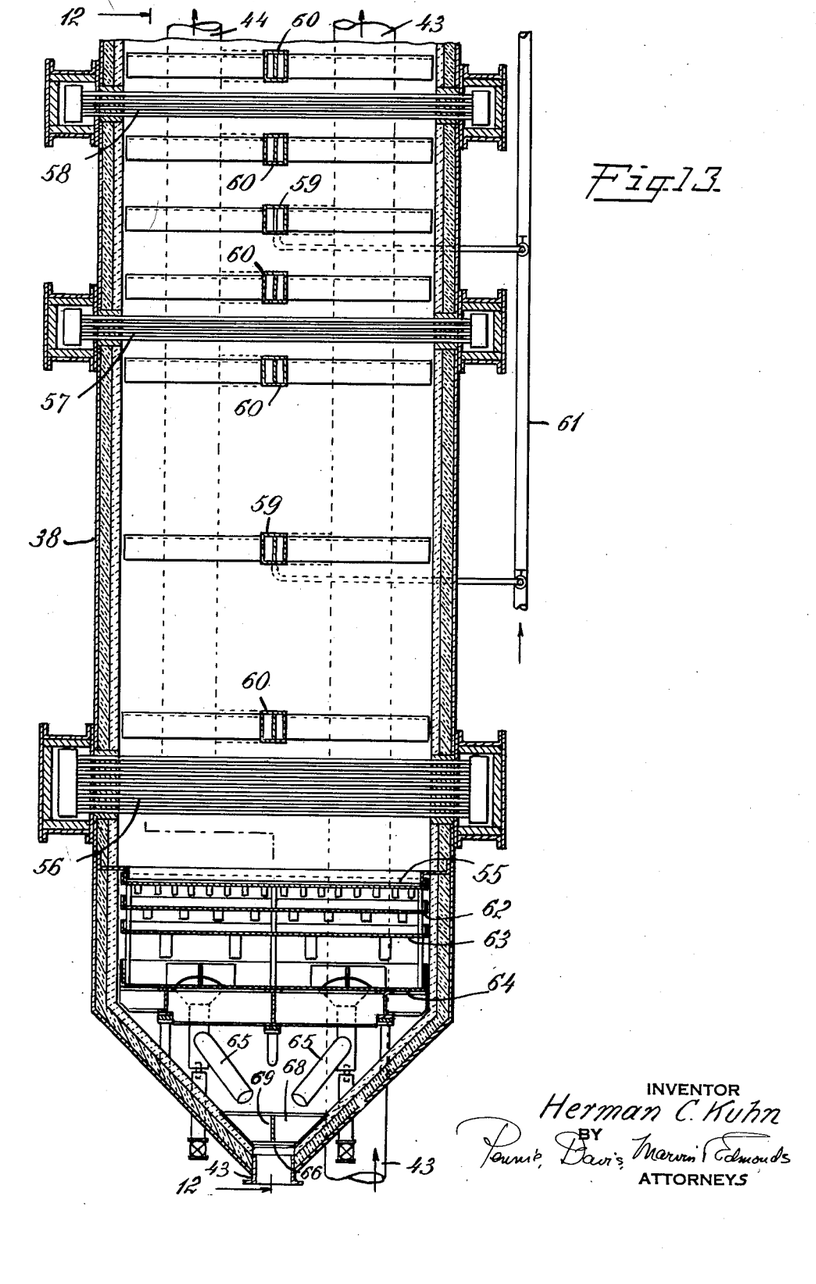
Fig. 13 is an enlarged vertical section of the lower part of the regenerating kiln illustrated in Fig. 11 taken at right angles to the section constituting Fig. 12.
Figure 14:
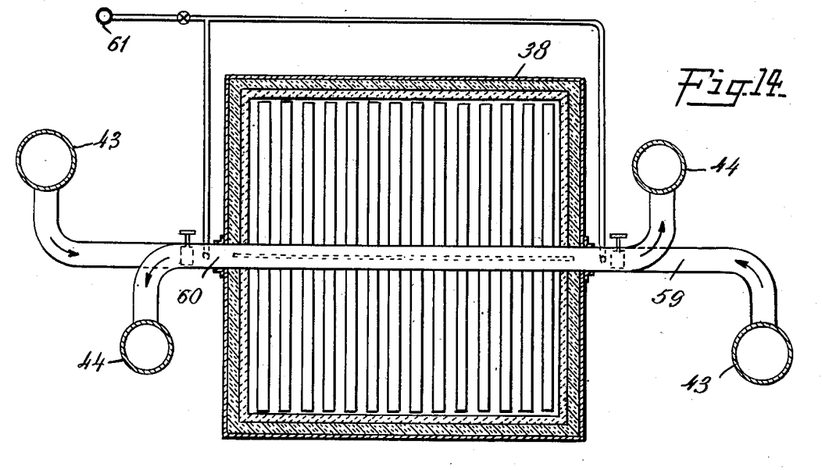
Fig. 14 is a section on line 14—14 of Fig. 12.
Figure 15:
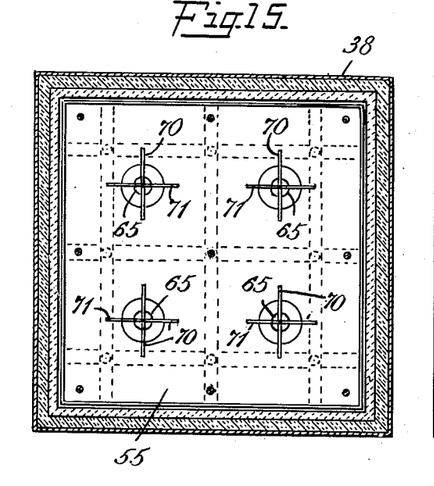
Fig. 15 is a section on line 15—15 of Fig. 12.
Figure 16:
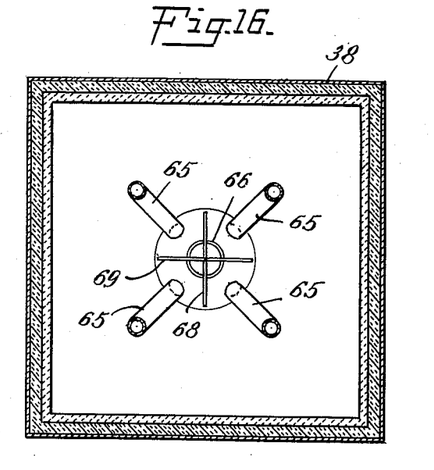
Fig. 16 is a section on line 16—16 of Fig. 12.
Figures 17, 25, 26:
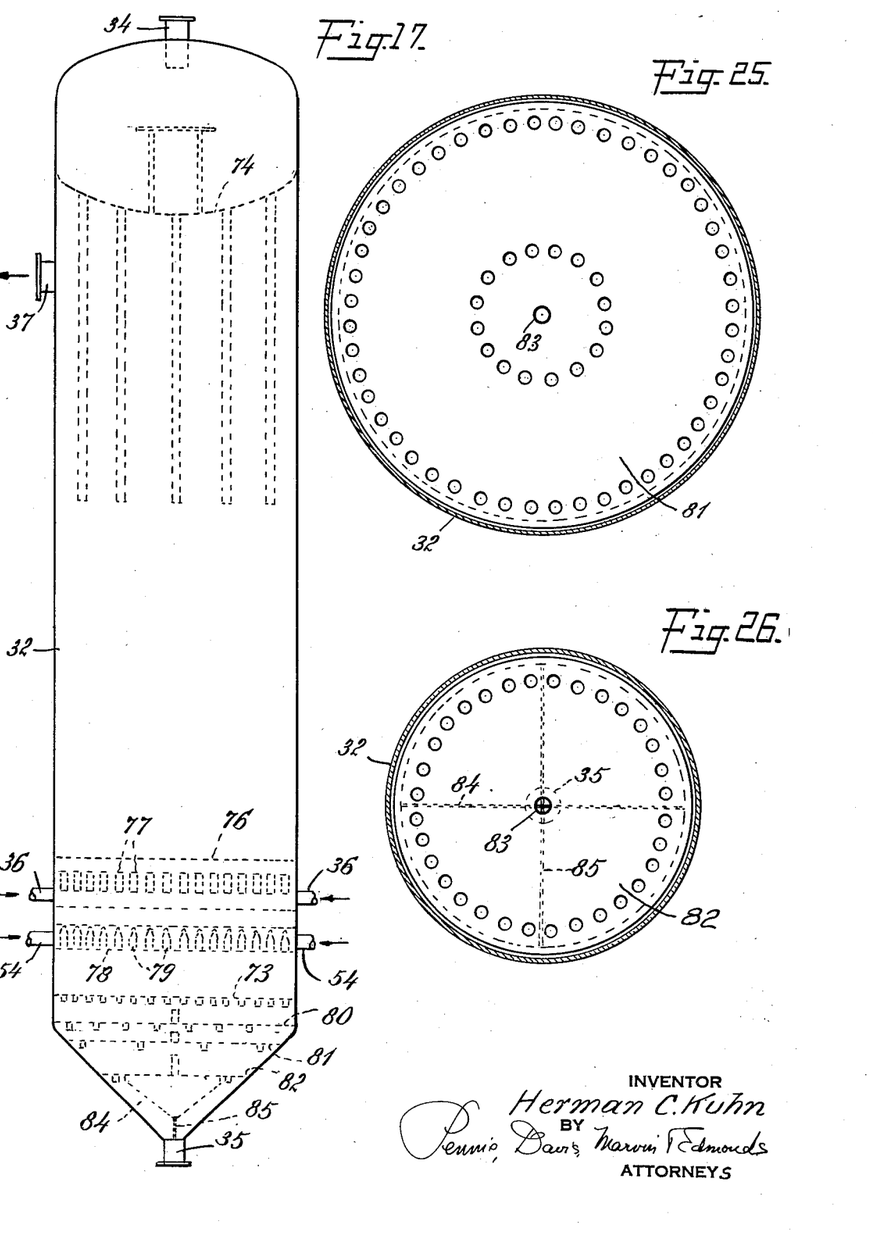
Fig. 17 is an elevation of the cracking reactor illustrated in Fig. 11.
Fig. 25 is a section on line 25—25 of Fig. 19.
Fig. 26 is a section on line 26—26 of Fig. 19.
Figure 18:
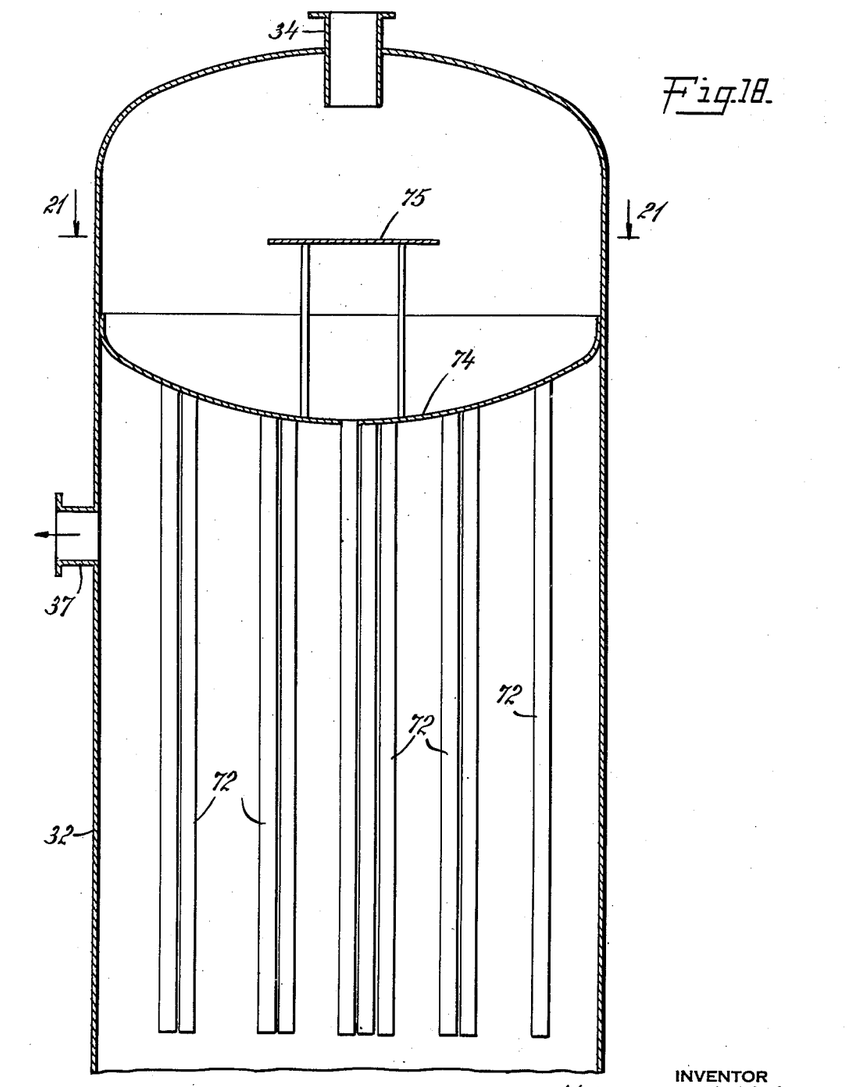
Fig. 18 is an enlarged vertical section of the upper part of the cracking reactor illustrated in Fig. 17.

Referring to Fig. 11 as a diagram of the cracking operation as a whole: A charge of catalyst is maintained in a reactor 32, the regenerated catalyst being supplied from storage chamber 33 through connection 34 and spent catalyst being discharged through connetcion 35. The temperature in the reactor may approximate, for example, 900°–975° F. and the pressure in the reactor may approximate 6–10 lbs. per square inch gauge. Connection 34 is made long enough to serve as a seal. The hydrocarbons to be cracked are introduced into the reactor as a vapor mixture through connection 36. Steam to strip the spent catalyst leaving the reactor of vaporizable material is introduced through connection 54. The cracked hydrocarbons together with any uncracked material and the stripping steam leave the reactor as a vapor mixture through connection 37. Spent catalyst is lifted to the top of the kiln 38 by means of bucket elevator 39, entering the kiln through connection 40. Any fresh catalyst required to maintain the volume of catalyst in circulation in the system is introduced through connection 41 and lifted to the top of the kiln 38 by means of elevator 39 together with the spent catalyst. The catalyst moves downwardly through the kiln through a series of bodies in a corresponding series of zones through which air is blown by means of blower 42 and distributing ducts or manifolds 43 with appropriate connections to each of the several zones. The products of combustion escape from each of the several zones through ducts or manifolds 44, ultimately escaping through stack 45. The regenerated catalyst discharged from the lower end of the kiln through connection 46 is lifted to the catalyst storage chamber 33 by means of bucket elevator 47. Part of the regenerated catalyst passes from the head of elevator 47 directly to chamber 33 through connection 48. Another part, 5%–10% of the total for example, passes, through connection 49 to an elutriator 50. In this elutriator this diverted part of the regenerated catalyst falls through a rising stream of part of the gases passing to the stack, the fines being carried off with the gases and the coarser material returned through connection 51 to the foot of the elevator 47. Or, the coarser material may be returned, through an appropirate seal, directly to the top of the kiln. Before escaping through the stack 45 the products of combustion pass through a series of cyclone separators 52 in which fines carried out of the elutriator together with any fines carried out of the kiln proper are separated and discharged through connection 53. The kiln, the catalyst storage chamber, the reactor, the elevators and the several connections through which the catalyst passes are thermally insulated to minimize heat loss.

Referring to Figs. 12–16 as an illustration of a regenerating kiln embodying my invention: The kiln comprises a rectangular thermally insulated and refractory lined shell. Spent catalyst is charged into the upper end of the kiln through an appropriate connection (see Fig. 11) and regenerated catalyst is discharged from the lower end of the kiln through connection 46, the kiln being maintained substantially full of catalyst between a level maintained in the upper part of the kiln and the uppermost of the collector baffles, baffle 55, in the lower part of the kiln. This charge of catalyst is divided into a series of bodies, ten for example, by groups of tubes 56, 57, 58, etc., through which a cooling medium is circulated, each of these bodies being within a zone independent of the others for control purposes. A grid of distributing troughs for introduction of air is arranged centrally of each zone and is connected to the air manifolds 43 through beam ducts 59, an appropriate opening through the wall of the beam ducts being provided beneath the inner end of each of the distributing troughs. A pair of grids of collecting troughs is arranged above and below these distributing troughs in each zone and is similarly connected to stack manifolds 44 through beam ducts 60. Valved connections are provided for introducing steam, from manifold 61, into the grid of distributing troughs in each of the several zones as may be required. Several connections between the manifold 60 and the several zones may also be used in an emergency to introduce steam as a smothering agent. To promote uniform flow of the catalyst downwardly through the kiln, a series of collector baffles 55, 62, 63 and 64 each carrying appropriately arranged discharge ports is provided in the lower part of the kiln, the lowermost baffle 64 carrying four discharge ports 65 symmetrically arranged about the central discharge port 66 at the lower end of the kiln, the baffle 63 next above carrying sixteen discharge ports 67 in groups of four symmetrically arranged with respect to one of the discharge ports 65 and so on. The discharge ports carried by the lowermost baffle 64 are in the form of tubes extending vertically downward from the baffle and then inclined inwardly toward the vertical axis of the shaft and central discharge port 66 at an angle steeper than the angle of repose of the catalyst to a terminal opening short of the shaft axis but closer to that axis than the aperture in the baffle 64 opening into the discharge port. A pair of intersecting vertical baffles 68 and 69, each passing through the vertical axis of the discharge port 66 and each of width measured along the vertical axis of discharge port 66 so great that at the minimum and maximum and all intermediate angles of repose the surfaces of the bodies of catalyst forming beneath the terminal openings of the four discharge ports 65 intersect the vertical axis of the discharge port 66 within the boundaries of these vertical baffles 68 and 69, are provided in the lower end of the kiln immediately above the discharge port 66. Each of the discharge ports 65 serve equal horizontal sections of the kiln and the angles between the two baffles are equal and equal in number to the number of discharge ports. Similarly, a pair of baffles 70 and 71 are provided immediately above each of the four discharge ports 65 and beneath the terminal openings of the discharge ports 67 carried by the next higher collector baffle 63. Again, these vertical baffles 70 and 71 intersect the vertical axes of the apertures through baffle 64 opening into the discharge ports 65 and are of width measured along these vertical axes so great that at the minimum and maximum and all intermediate angles of repose the surfaces of the bodies of catalyst forming beneath the terminal openings of the discharge ports 67 intersect the vertical axis of the nearest discharge port 65 within the boundaries of the vertical baffles 70 and 71.

Figure 19:
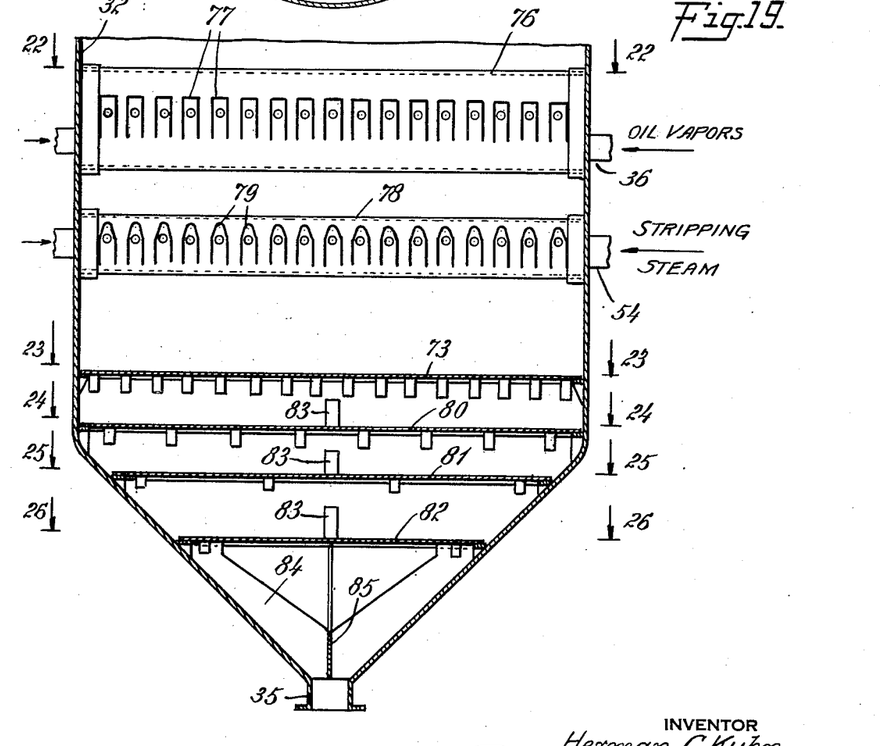
Fig. 19 is an enlarged vertical section of the lower part of the cracking reactor illustrated in Fig. 17.
Figures 20, 22, 27, 28:
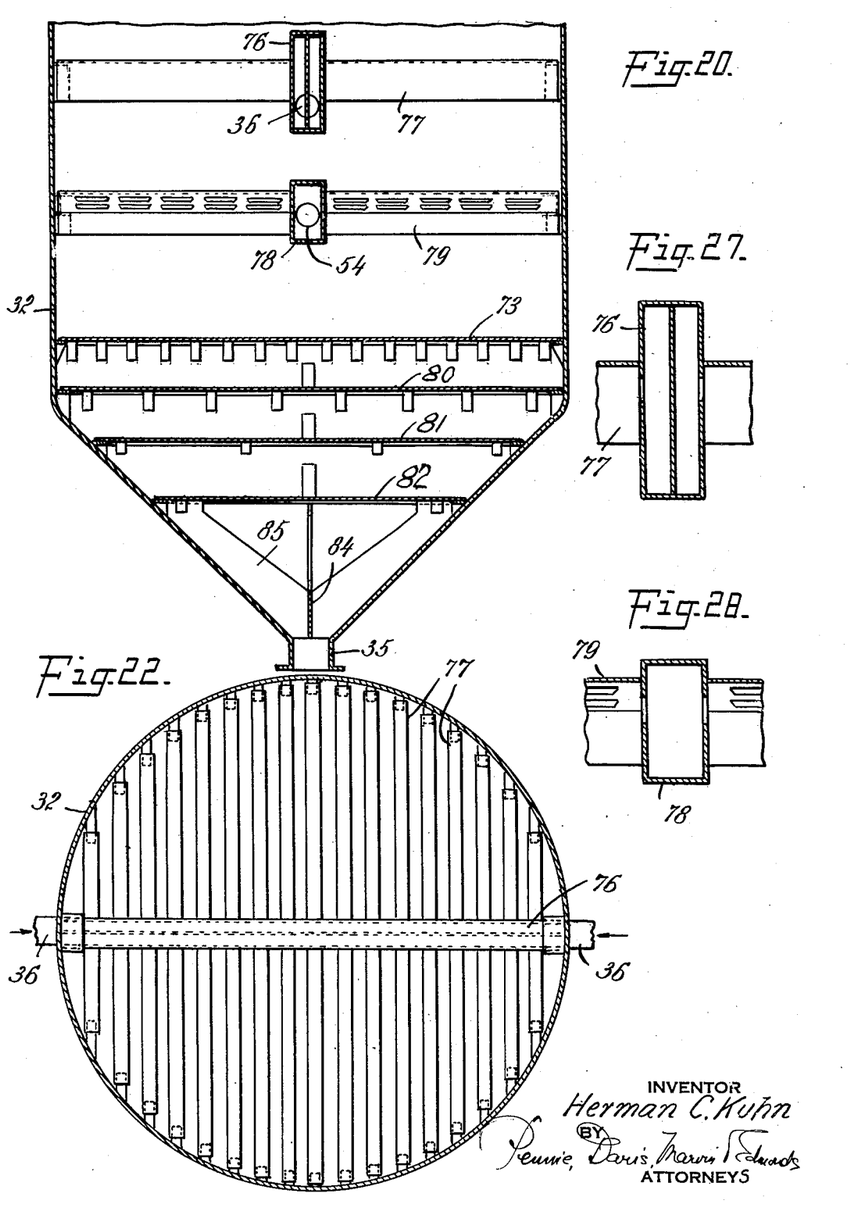
Fig. 20 is an enlarged vertical section of the lower part of this cracking reactor taken at right angles to the section illustrated in Fig. 19.
Fig. 22 is a section on line 22—22 of Fig. 19.
Fig. 27 is an enlarged section of the collector header (see Fig. 17).
Fig. 28 is an enlarged section of the distributor header (see Fig. 17).
Figure 21:
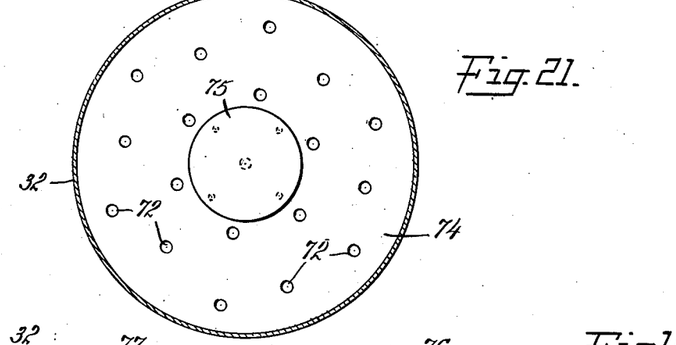
Fig. 21 is a section on line 21—21 of Fig. 18.
Figure 23:
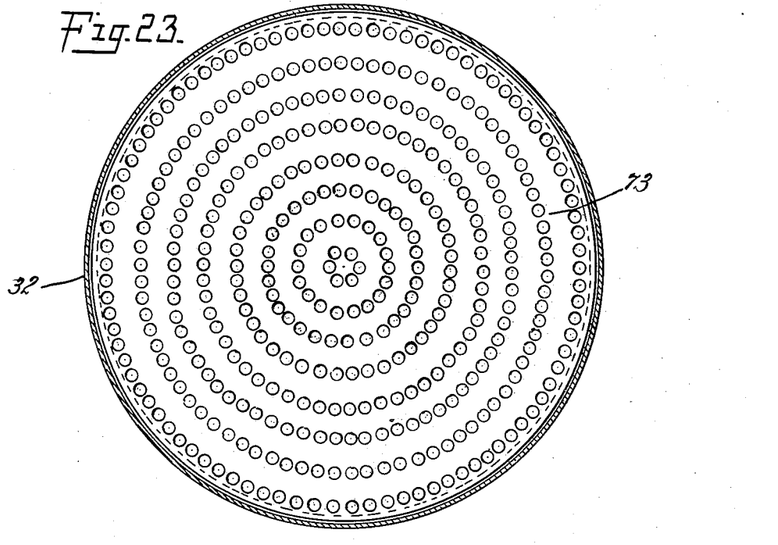
Fig. 23 is a section on line 23—23 of Fig. 19.
Figure 24:
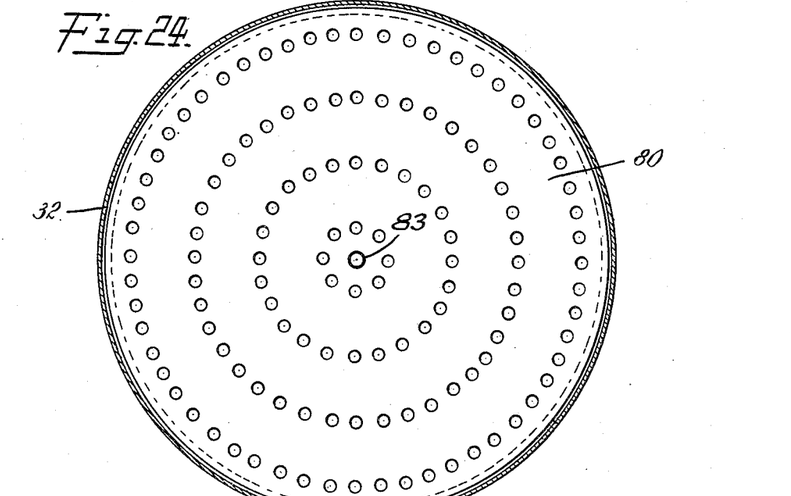
Fig. 24 is a section on line 24—24 of Fig. 19.

Referring to Figs. 17–28 as an illustration of a cracking reactor embodying my invention: The reactor comprises a cylindrical thermally insulated vessel. Fresh catalyst or regenerated catalyst or a mixture of the two is charged into the upper end of the reactor through an appropriate connection (see Fig. 11) and spent catalyst is discharged from the lower end of the reactor through connection 35, the reactor being maintained substantially full of catalyst between the lower ends of the distributing tubes 72 and the uppermost of the collector baffles, baffle 73, in the lower part of the reactor. A partition 74 separates the catalyst charging chamber in the upper part of the reactor from that region in the vessel in which the hydrocarbons to be cracked pass in contact with the catalyst. A baffle 75 beneath the discharge of connection 34 spreads the entering catalyst over this partition. The catalyst then flows through the distributing tubes 72 (see Fig. 21) into the region of reaction. As the charge of catalyst in the reactor, as the result of discharge through connection 35, moves away from the lower ends of these distributing tubes 72, additional catalyst immediately flows through the tubes keeping the lower ends of the tubes covered, the charge of catalyst in the reactor thus being automatically maintained. The distributor tubes 72 also assist in preventing the escape of hydrocarbons through the catalyst supply connections and provide free space above the charge of catalyst in the reactor for separation of any catalyst material entrained in the vapors. The hydrocarbons to be cracked are introduced into the reactor as a vapor mixture through connection 36, the beam duct 76 and the associated distributing troughs 77 (see Figs. 19, 20, 22 and 27). Steam to strip the spent catalyst leaving the reactor of vaporizable material is introduced through connection 54, beam duct 78 and distributing troughs 79 (see Figs. 19, 20 and 28). The cracked hydrocarbons together with any uncracked material and the stripping steam leave the reactor as a vapor mixture through connection 37. To promote uniform flow of the catalyst downwardly through the reactor, a series of collector baffles 73, 80, 81 and 82 each carrying appropriately arranged discharge ports is provided in the lower part of the reactor. The arrangement of the discharge ports on baffle 73 is shown in Fig. 23, on baffle 80 in Fig. 24, on baffle 81 in Fig. 25 and on baffle 82 in Fig. 26. The several discharge ports are in the form of short tubes extending downwardly from the baffle beneath corresponding apertures in the baffle. A vent 83 is provided in each of the three lower baffles. A large number of discharge ports opening through baffle 73 makes the provision of such a vent in this baffle unnecessary. A pair of intersecting vertical baffles 84 and 85, each passing through the vertical axis of the discharge port 35, are provided in the lower part of the reactor immediately above the discharge port 35. These baffles are each of width measured along the vertical axis of discharge port 35 so great that at the minimum and maximum and all intermediate angles of repose the surfaces of the bodies of catalyst forming beneath the terminal openings of the discharge ports through the lowermost collector baffle 82 intersect the vertical axis of the discharge port 35 within the boundaries of these vertical baffles. The upper boundary of these vertical baffles is with advantage, as illustrated in Figs. 19 and 20, arranged to extend above the surfaces of the bodies of catalyst forming beneath these discharge ports at the minimum angle of repose throughout the region below the terminal openings of these discharge ports.

It will be apparent that the changes involved in applying my invention to a cracking reactor or a regenerating kiln are extremely simple. However, the improved results attained in use of my invention are not to be compared to these changes. My invention substantially improves uniformity and regularity of catalyst flowing through the region of reaction in catalytic cracking operations and accomplishes the improvements, in operation, resulting from more regular and more uniform catalyst flow. Essentially, my invention consists in the provision, in combination with a discharge port at one level and a plurality of discharge ports at a higher level through which catalyst flows to the first mentioned discharge port, of one or more vertical baffles passing through the axis of the lower discharge port with boundaries so positioned that the surfaces of the bodies of catalyst forming beneath the higher discharge ports intersect the axis of the lower discharge port within the boundaries of the baffle or baffles irrespective of such variations in the angle of repose of the catalyst as may occur in operation.

I claim:

1. In combination, in a catalytic cracking reaction vessel comprising a series of apertured collector baffles for controlling catalyst flow therethrough, with a discharge port at one level and a plurality of discharge ports at a higher level through one of such baffles immediately above the first mentioned discharge port, upstanding flow directing means formed by a vertical baffle passing through the vertical axis of the first mentioned discharge port between the two levels and of width such as to intercept and control lateral distribution of flow of catalyst entering the first mentioned discharge port.

2. In combination, in a catalytic cracking reaction vessel comprising a series of apertured collector baffles for controlling catalyst flow therethrough, with a discharge port at one level and a plurality of discharge ports at a higher level through one of such baffles immediately above the first mentioned discharge port, upstanding flow directing means formed by a plurality of vertical baffles intersecting each other and passing through the vertical axis of the first mentioned discharge port between the two levels and symmetrically arranged with respect to the higher discharge ports and of width such as to intercept and control lateral distribution of flow of catalyst entering the first mentioned discharge port.

3. An apparatus for contacting a gas with particle-form solid material comprising a chamber having a closed bottom terminating in a discharge duct, means to supply particle-form solid material to the upper portion of the chamber, means to supply gas to said chamber and means to remove contacted gas therefrom, at least two horizontal vertically spaced partitioning plates across the lower portion of the chamber, the uppermost partitioning plate having a plurality of uniformly distributed apertures therein and successive partitioning plates below said first partitioning plate having progressively decreasing numbers of apertures therein, said apertures in any one of said successive partitioning plates being horizontally staggered with respect to apertures in the partitioning plate thereabove, and upstanding flow directing means formed by vertically extending intersecting plates over apertures in at least one of the partitioning plates below the uppermost one, the line of intersection of said plates at least approximately coinciding with the axis line of the aperture over which it is positioned, and each flow directing means on any partitioning plate forming sufficient angular reception spaces between the upstanding intersecting plates so that each staggered aperture in the overlying partitioning plate has a separate angular reception space for receiving flow therefrom.

HERMAN C. KUHN.

REFERENCES CITED

The following references are of record in the file of this patent:

UNITED STATES PATENTS

| Number | Name | Date |
|---|---|---|
| 778,301 | Burdick | Dec. 27, 1904 |
| 2,389,493 | Evans | Nov. 20, 1945 |
| 2,486,200 | O'Connor | Oct. 25, 1949 |